US008855074B2

(12) United States Patent
Hoymann

(10) Patent No.: US 8,855,074 B2
(45) Date of Patent: Oct. 7, 2014

(54) MULTIPLEXING CONTROL AND DATA IN ONE RESOURCE BLOCK

(71) Applicant: Christian Hoymann, Aachen (DE)

(72) Inventor: Christian Hoymann, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 181 days.

(21) Appl. No.: 13/573,793

(22) Filed: Oct. 3, 2012

(65) Prior Publication Data
US 2013/0083745 A1 Apr. 4, 2013

Related U.S. Application Data

(60) Provisional application No. 61/542,687, filed on Oct. 3, 2011.

(51) Int. Cl.
H04W 72/04 (2009.01)

(52) U.S. Cl.
USPC .......................................... 370/329

(58) Field of Classification Search
CPC ................................... H04W 72/04
USPC .......................................... 370/329
See application file for complete search history.

(56) References Cited

U.S. PATENT DOCUMENTS

2011/0141992 A1* 6/2011 Classon ......................... 370/329
2011/0269474 A1* 11/2011 Parkvall et al. ............... 455/445

OTHER PUBLICATIONS

Huawei et al., "Investigation on downlink control channel and signalling enhancements", 3GPP TSG RAN WG1#66, Athens, Greece, Aug. 22, 2011, pp. 1-4, R1-112049, 3rd Generation Partnership Project.
Catt, "Design of enhanced PDCCH in Rel-11", 3GPP TSG RAN WG1 Meeting #66, Athens, Greece, Aug. 22, 20112, pp. 1-4, R1-112119, 3rd Generation Partnership Project.
Research in Motion et al., "Design Consideration for E-PDCCH", 3GPP TSG RAN WG1 Meeting #66, Athens, Greece, Aug. 22, 2011, pp. 1-6, R1-112373, 3rd Generation Partnership Project.
Samsung, "Discussion on ePDCCH Design Issues", 3GPP TSG-RAN1#66 meeting, Athens, Greece, Aug. 22, 2011, pp. 1-4, R1-112517, 3rd Generation Partnership Project.
Potevio, "Discussion on downlink control channel enhancements", 3GPP TSG-RAN1#66 meeting, Athens, Greece, Aug. 22, 2011, pp. 1-4, R1-112580, 3rd Generation Partnership Project.
Research in Motion et al., "Interference Management for Heterogeneous Network", 3GPP TSG RAN WG1 Meeting #60, San Francisco, USA, Feb. 22, 2010, pp. 1-6, R1-101106, 3rd Generation Partnership Project.
Ericsson et al., "Enhancements for UE specific control signaling", 3GPPTSG-RAN WGI #65, Barcelona, Spain, May 9, 2011, pp. 1-4, 3rd Generation Partnership Project.

* cited by examiner

Primary Examiner — Sulaiman Nooristany
(74) Attorney, Agent, or Firm — Coats and Bennett, PLLC

(57) ABSTRACT

A method for operating a control node for a wireless communication system. The control node creates a data frame having at least one resource block. The data elements of the resource block are subdivided into at least a first subset and a second subset The first subset comprises first control data for controlling a receiving node The second subset comprises data elements of said resource block not used for control data for controlling said receiving node. The method further comprises checking whether second control data for a second receiving node are to be put into the second subset, scheduling payload data for the receiving node into the second subset if second control data are not to be put into the second subset of data elements, and transmitting the data frame to the receiving node.

29 Claims, 9 Drawing Sheets

MULTIPLEXING CONTROL AND DATA IN ONE RESOURCE BLOCK

RELATED APPLICATION

This application claims the benefit of U.S. Provisional Patent Application 61/542,687 filed Oct. 3, 2011, which is incorporated herein by reference.

TECHNICAL FIELD

The present invention generally relates to radio communication systems, base stations, relay nodes, controller nodes, user equipment (user terminals), software and methods for said systems and nodes and, more particularly, to mechanisms and techniques for handling communications in radio communication systems. In particular, a design allowing multiplexing of an enhanced Physical Downlink Control Channel (ePDCCH) and a Physical Downlink Shared Channel (PDSCH) in the same resource block.

BACKGROUND

The background is described with respect to LTE (Long Term Evolution). The skilled person will however realize that the principles of the invention may be applied in other radio communication systems, particularly in communication systems that rely on scheduled data transmissions.

The downlink transmission of the LTE (Long Term Evolution), or E-UTRAN radio access, is based on Orthogonal Frequency Division Multiplex (OFDM). The basic LTE downlink physical resource can thus be seen as a time-frequency grid as illustrated in FIG. 1, where each resource element (RE) corresponds to one OFDM subcarrier during one OFDM symbol interval. The dark shadowed resource elements form a resource block.

In the time domain, transmissions in LTE are structured into frames and subframes. Each frame of length $T_f=10$ ms consists of ten equally-sized subframes of length $T_{subframe}=1$ ms. Each subframe, in turn, consists of two equally-sized slots of length $T_{slot}=0.5$ ms.

Resource blocks (RBs) are also defined in LTE, where each RB consists of 12 contiguous subcarriers during one slot. The subcarrier spacing is set to $\Delta f=15$ kHz. In addition, a reduced subcarrier spacing of 7.5 kHz is defined targeting multicast broadcast transmissions in single-frequency networks.

Generally a resource element may be defined by certain ranges in any combination of the transmission resource, which are essentially time, frequency, code and space, depending on the actual transmission system under consideration.

The LTE time domain structure, in which one radio frame is divided into the 10 subframes #0 to #9 and each subframe is divided into a first and a second slot as depicted in FIG. 2.

In LTE data transmissions to/from a user equipment (UE) are under strict control of the scheduler located in the eNB. Control signaling is sent from the scheduler to the UE to inform the UE about the scheduling decisions. This control signaling, consisting of one or several PDCCHs (Physical Downlink Control Channels) as well as other control channels, is transmitted at the beginning of each subframe in LTE, using 1-3 OFDM symbols out of the 14 available in a subframe (for normal CP and bandwidths larger than 1.8 MHz, for other configurations the numbers may be different).

Downlink scheduling assignments, used to indicate to a UE that it should receive data from the eNB occur in the same subframe as the data itself. Uplink scheduling grants, used to inform the UE that it should transmit in the uplink occur a couple of subframes prior to the actual uplink transmission.

Generally, control data may comprise at least one of a downlink assignment and an uplink grant.

Among other information necessary for the data transmission, the scheduling assignments (and grants) contain information about the frequency-domain location of the resource blocks used for data transmission in the first slot. The frequency-domain location of the RBs in the second slot is derived from the location in the first slot, e.g. by using the same frequency location in both slots.

Thus, scheduling assignments/grants operate on pairs of resource block in the time domain. An example hereof is shown in FIG. 3.

In FIG. 3, the slopingly hatched parts in each resource block 0 to 9 contains control data, whereas the horizontally hatched parts contain payload data. The subframe is divided into a first slot and a second slot. The control data is part of the first slot.

For LTE Release-11 an enhanced Physical Downlink Control Channel is being discussed. In the following it is referred to as ePDCCH. This control channel is used to transmit control data/control signaling. Investigations are motivated by RAN1 email discussion "[66-04] Downlink control signalling enhancements":

Firstly, the PDCCH (Physical Downlink Control Channel) does not provide the flexibility in frequency domain for control channel interference coordination between cells or any potential for frequency selective scheduling gain of the control channel. Secondly, the PDCCH overhead does not scale well with the number of scheduled UEs. Thirdly, the growing use of PDSCH (Physical Downlink Shared Channel) transmission in MBSFN (Multicast/Broadcast Single Frequency Network) subframes is limited by the fact that only two OFDM symbols can be used for PDCCH. Fourthly, the PDCCH cannot leverage advantage of multiple antennas at the eNB through beamforming gain to make the control channel performance scale with the number of transmit antennas. And last, the intra-cell spatial reuse of control channel resources which is useful for novel deployments and antenna structures as the shared cell scenario is not possible with the PDCCH.

Multiple ePDCCHs can be transmitted in a subframe and similar to the LTE 3GPP Release 8 PDCCH the concept of a search space will be applied: a search space is a set of locations in the time-frequency grid, where the UE (or any receiving node of the control channel) can expect an ePDCCH transmission. The Release 8 control region (i.e. the region, wherein the search space is determined) spans the whole freq. domain and the search space is determined taking all RBs into account. The ePDCCH control region will typically not occupy the full system bandwidth so that the remaining resources can be used for other kinds of transmission, e.g., data to UE.

The invention is particularly relevant for LTE based systems. Downlink control signaling is discussed in Section 16.2.4, pages 333 to 336, of the book entitled 3G Evolution: HSPA and LTE for Mobile Broadband, first edition 2007 by Dahlmann, Parkvall Skoeld and Beming. It is also pointed to the standards 3GPP LTE Rel-10. The cited references/documents are incorporated by reference herewith.

SUMMARY

It is an object of the invention to enhance the flexibility of transmitting payload data and control data in an LTE sub frame. This object is achieved by the independent claims. Advantageous embodiments are described in the dependent claims.

The invention relates to a method for operating a control node for a wireless communication system and comprises the step of creating a data frame defined by a frequency band and a time frame, comprising a plurality of data elements, wherein each data element is define by one of a plurality of subcarrier frequencies within said frequency band and one of a plurality of time intervals within said time frame, wherein a resource block comprises a number of data elements adjacent in time and frequency, wherein the data elements of a resource block are subdivided into at least a first subset and a second subset, wherein the first subset comprises first control data for controlling a first receiving node, and wherein the second subset comprises data elements of said resource block not used for control data for controlling said first receiving node. The method comprises the further steps of checking whether second control data for a second receiving node are to be put into the second subset, scheduling payload data for the first receiving node into the second subset if second control data for the second receiving node are not to be put into the second subset of data elements and transmitting the data frame to the receiving node.

The inventions further relates to a control node for a wireless communication system, comprising a controller for creating a data frame defined by a frequency band and a time frame, comprising a plurality of data elements, wherein each data element is define by one of a plurality of subcarrier frequencies within said frequency band and one of a plurality of time intervals within said time frame, wherein a resource block comprises a number of data elements adjacent in time and frequency, wherein the data elements of a resource block are subdivided into at least a first subset and a second subset, wherein the first subset comprises first control data for controlling a first receiving node, and wherein the second subset comprises data elements of said resource block not used for control data for controlling said first receiving node. The control node further comprises a checking entity for checking whether second control data for a second receiving node are to be put into the second subset, a scheduler for scheduling payload data for the receiving node into the second subset if second control data for the second receiving node are not to be put into the second subset of data, and a transmitter for transmitting the data frame to the receiving node.

The invention further relates to a method for operating a receiving node for a wireless communication system, comprising the step of receiving, from a control node, a data frame defined by a frequency band and a time frame, comprising a plurality of data elements, wherein each data element is define by one of a plurality of subcarrier frequencies within said frequency band and one of a plurality of time intervals within said time frame, wherein a resource block comprises a number of data elements adjacent in time and frequency, wherein the data elements of a resource block are subdivided into at least a first subset and a second subset, and wherein the first subset comprises first control data for controlling a receiving node, and wherein the second subset comprises data elements of said resource block not used for control data for controlling said receiving node. The method further comprises the steps of detecting whether the second subset contains payload data; and processing the second subset of data elements in dependence of the detection.

The invention further relates to a receiving node for a wireless communication system, comprising a receiver for receiving a data frame defined by a frequency band and a time frame, comprising a plurality of data elements, wherein each data element is define by one of a plurality of subcarrier frequencies within said frequency band and one of a plurality of time intervals within said time frame, wherein a resource block comprises a number of data elements adjacent in time and frequency, wherein the data elements of a resource block are subdivided into at least a first subset and a second subset, wherein the first subset comprises first control data for controlling a receiving node, and wherein the second subset comprises data elements of said resource block not used for control data for controlling said receiving node. The receiving node further comprises a detector for detecting whether the second subset contains payload data; and a processor for processing the second subset of data elements in dependence of the detection.

DETAILED DESCRIPTION

Figure 1:
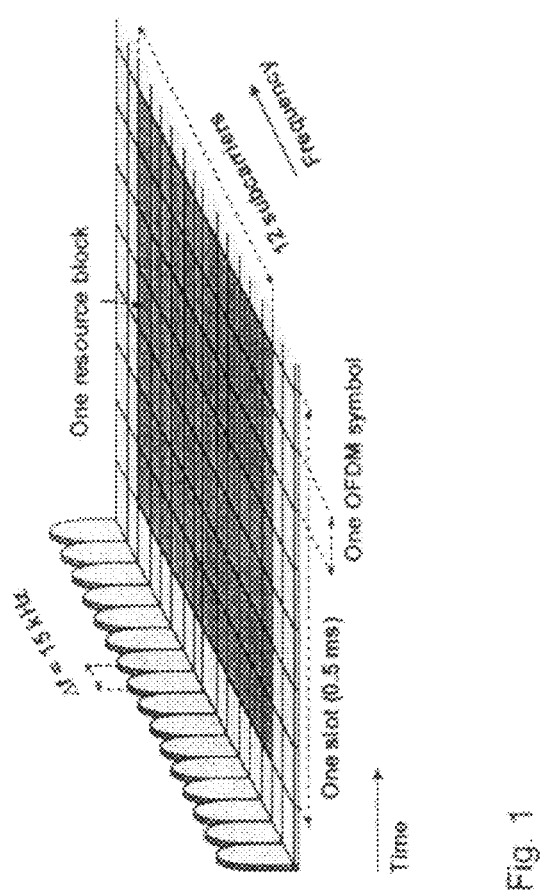
FIG. 1 shows a physical resource in a time frequency grid as used in LTE.
Figure 2:
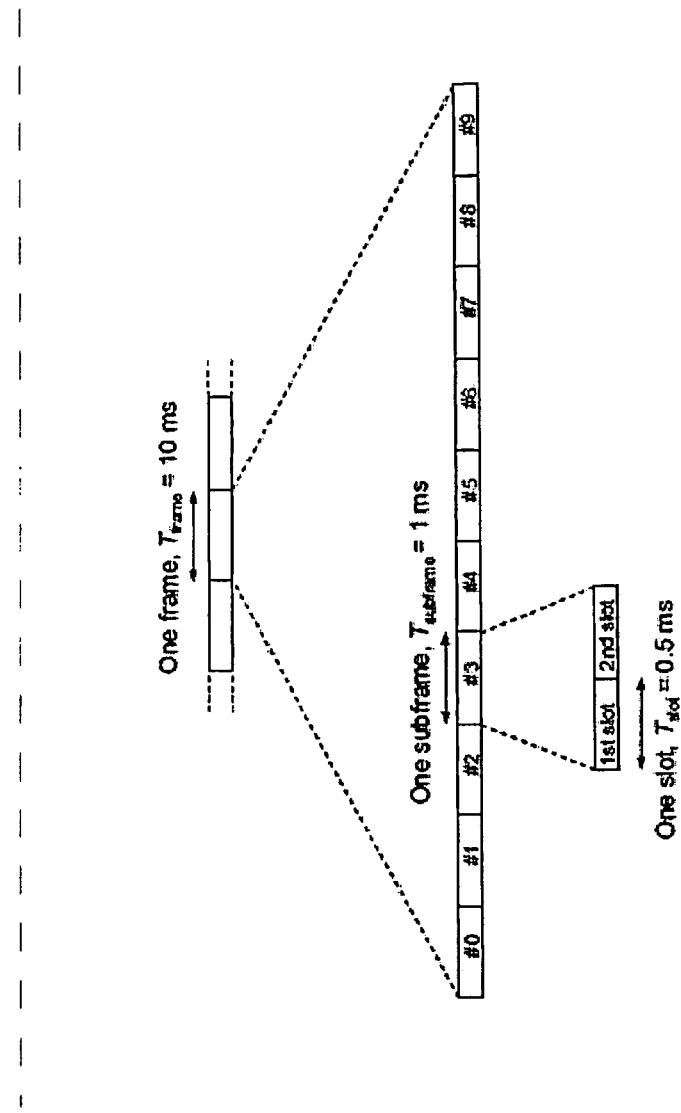
FIG. 2 shows a LTE time domain structure.
Figure 3:
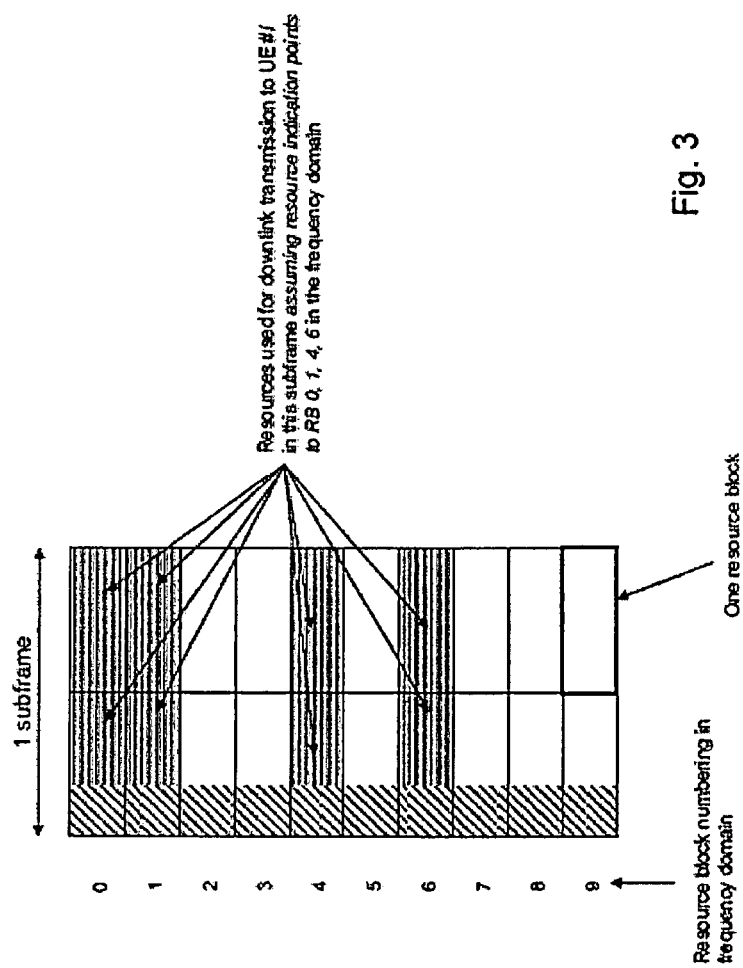
FIG. 3 shows an example of a scheduling decision indicating resource blocks upon which the UE should receive data.
Figure 4:
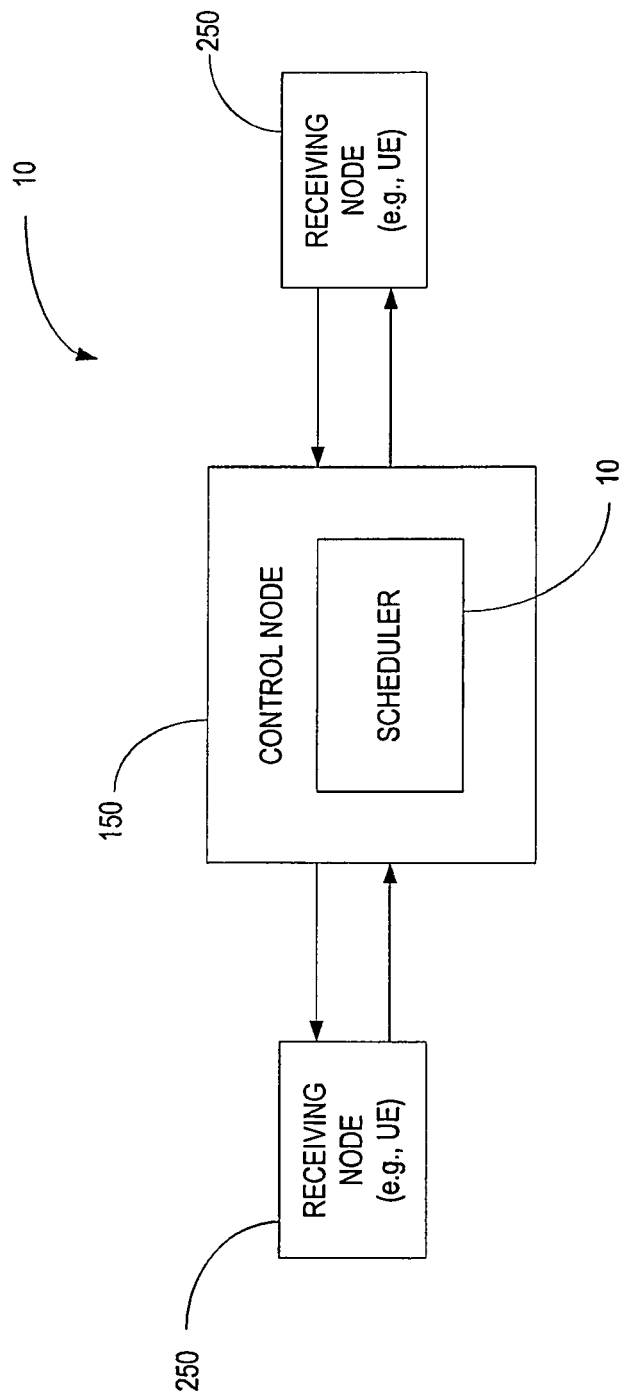
FIG. 4 shows a wireless communication system.

FIG. 4 illustrates a wireless communication system 10. The wireless communication system 10 comprises a control node 150 and a plurality of receiving nodes 250. The control node 150 communicates with the receiving nodes 250 over a wireless communication channel. The control node 150 may, for example, comprise a base station (also called an eNodeB in LTE systems) or a relay node. The receiving node 250 may comprise a relay node or user terminal (also called user equipment (UE) in LTE systems). The control node 150 includes a scheduler for scheduling transmissions to the receiving nodes 250 as will be hereinafter described.

The invention relates to a method for operating a control node 150 for a wireless communication system 10 comprising the steps: creating a resource block in a data frame comprising a first subset of data elements and a second subset of data elements, wherein the first subset comprises first control data for controlling a receiving node 250 and wherein the second subset comprises data elements of said resource block not used for control data for controlling said receiving node 250; checking whether third control data for another receiving node are to be put into the second subset; scheduling payload data for the receiving node 250 into the second subset if third control data are not to be put into the second subset; and transmitting the data frame to the receiving node 250. The data frame can be e.g. a LTE sub frame which comprises two 0.5 ms slots. The resource block can be part of the LTE sub frame. The data elements can be resource elements (REs) in LTE. A resource element in LTE is defined by one of a plurality of subcarrier frequencies within a frequency band and one of a plurality of time intervals (e.g. symbol periods) within said subframe.

Figure 5:
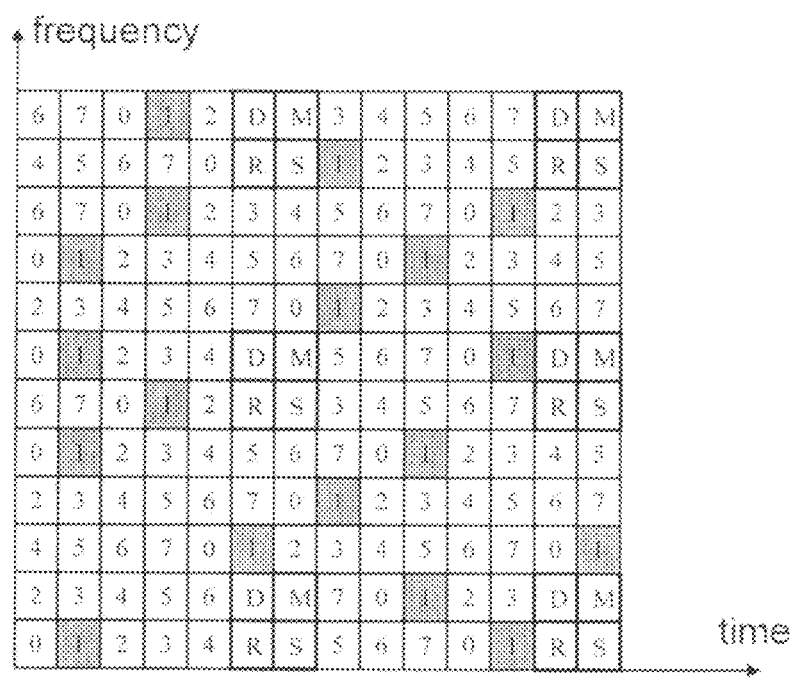
FIG. 5 shows a first example mapping of 8 mCCEs to REs of an RB pair.
Figure 6:
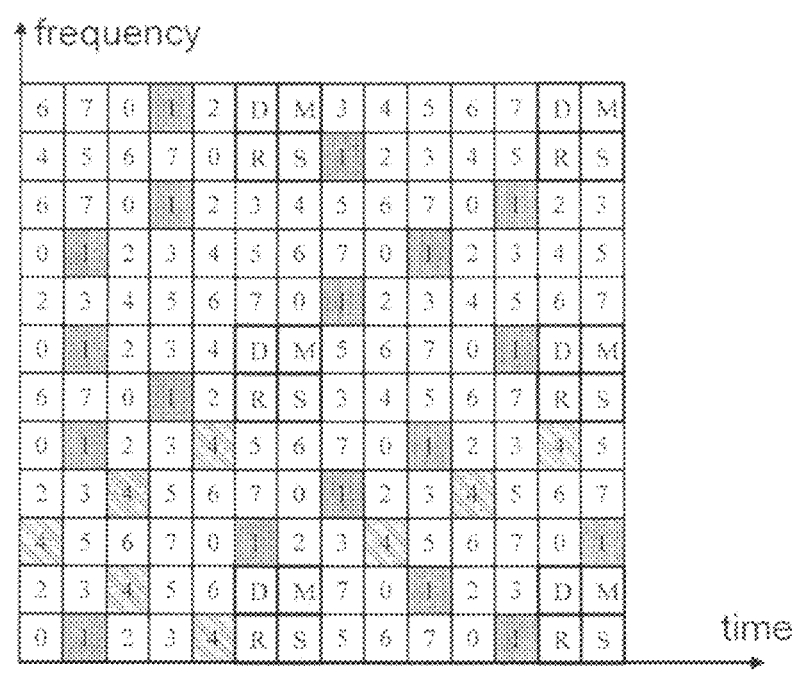
FIG. 6 shows a second example mapping of 8 mCCEs to REs of an RB pair.

Multiple mini control channel elements (mCCE) can be transmitted in an RB pair. FIGS. 5 and 6 shows an example mapping of 8 mCCEs to REs of an RB pair, where one mCCE occupies ⅛ of the available REs per subframe, i.e, 18 REs. REs unavailable for ePDCCH transmissions are for instance REs used for reference signals (RSs) such as UE-specific demodulation RS (DMRS). Using time-first mapping REs occupied by one mCCEs can be distributed across the subframe. In FIG. 5 the grey elements are occupied by the mCCE numbered #1. Other mapping, e.g. frequency first are possible as well.

LTE Release 11 will support a new control channel, the ePDCCH (enhanced Physical Downlink Control Channel). Unlike the PDCCH, where control and data is time multiplexed, the ePDCCH will be frequency multiplexed with the PDSCH. An ePDCCH carries, similarly to a PDCCH, either an uplink grant or a downlink assignment. Multiple ePDCCHs can be transmitted in a subframe and even within a resource block. Depending on the aggregation level an ePDCCH occupies one or more mCCEs. FIG. 5 shows an example mapping of 8 mCCEs to REs of an RB pair. The grey elements, i.e., the mCCE numbered #1, are occupied by an ePDCCH of aggregation level 1 carrying a DL assignment for controlling a receiving node 250 (UE). The grey elements constitute the first subset of data elements. If all other available REs (white in FIG. 5) are not used for other ePDCCHs for controlling said receiving node 250, they constitute the second subset of data elements.

If none of those available REs (white in FIG. 5) are used for transmissions to another receiving node 250, the second subset can be used for data transmission to said receiving node 250. If any of those available REs (white in FIG. 5) are used for an ePDCCH to another receiving node 250, the second subset cannot be used for data transmission to said receiving node 250.

The allocation of those REs can be done without changing the PDCCH content because by successfully detecting the ePDCCH, said receiving node 250 knows which REs have been used for the ePDCCH. Assuming that all other REs are used for a PDSCH transmission a UE can receive the PDSCH on the correct REs.

In case the ePDCCH carrying the DL assignment is submitted with a higher aggregation level, two or more mCCEs of an RB pair could be occupied. As an example, the mCCEs numbered #1 and #4 in FIG. 6 could be occupied by an ePDCCH of aggregation level 2 carrying a DL assignment for controlling a receiving node 250 (UE). The elements of mCCEs #1 and #4 would then constitute the first subset of data elements. If all other available REs (mCCEs #0, #2, #3, #5, #6, #7 in FIG. 6) are not used for other ePDCCHs for controlling said receiving node 250, they constitute the second subset of data elements.

In case more than one ePDCCH are transmitted to one receiving node 250, two or more mCCEs in a RB pair could be occupied. As an example, the mCCEs numbered #1 and #4 in FIGS. 5 and 6 could be occupied by two ePDCCHs each of aggregation level 1 carrying a DL assignment and an UL grant for controlling a receiving node 250 (UE). The elements of mCCEs #1 and #4 would then constitute the first subset of data elements. If all other available REs (mCCEs #0, #2, #3, #5, #6, #7) are not used for other ePDCCHs for controlling said receiving node 250, they constitute the second subset of data elements.

One part of the invention is to allow using the second subset of a resource blocks containing a DL assignment to UE #i for data to UE #i only (and not for data or control to other UEs).

Another part of the invention is to reuse the existing DCI formats but change the interpretation at the UE. The DCI formats for downlink assignments used in LTE Rel-8 and later releases specify the resources upon which the receiver (UE) should expect data from the eNB to be transmitted. The resource indication specifies in the frequency domain which resource blocks to receive and it is implicitly assumed that the full subframe (except the control region) is used for data transmission. Since a UE scheduled in the downlink by means of the ePDCCH knows upon which resources it has received the DL assignment, it is proposed to, at the UE, exclude the resources occupied by the decoded ePDCCH when determining upon which resources the data from the eNB is to be received.

Figure 7:
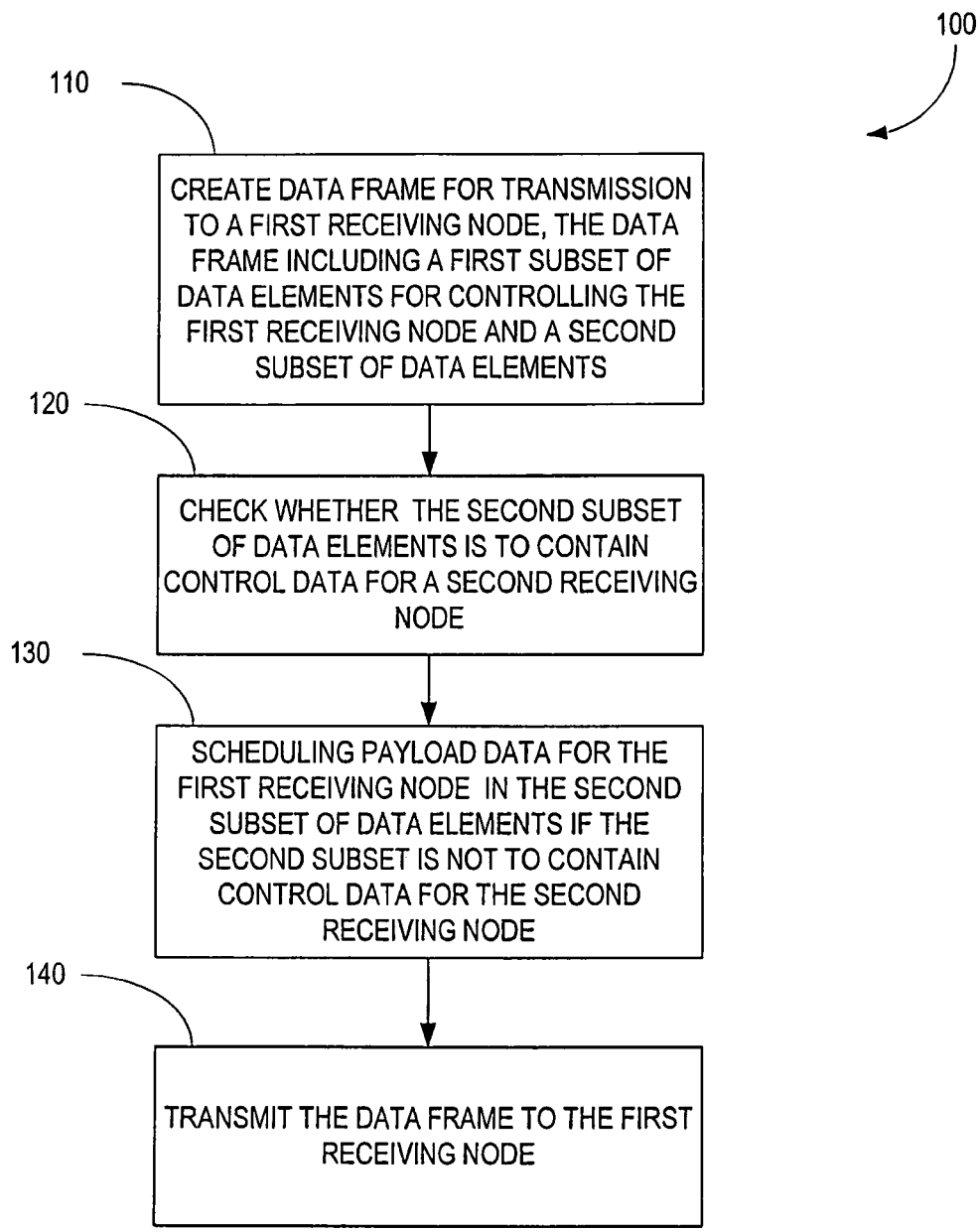
FIG. 7 illustrates a method implemented in a control node.

FIG. 7 illustrates a method 100 implemented by a control node in a wireless communication network. The control node creates a data frame including a plurality of data elements for transmission to a receiving node 250 (block 110). The data elements within a resource block of the data frame are divided into a first subset and a second subset. The first subset comprises control data for controlling the receiving node 250. The second subset comprises data elements not used for sending control data to the receiving node 250. The control node checks whether third control data for another receiving node 250 are to be put into the second subset of data elements (block 120). The control node schedules payload data for the receiving node 250 into the second subset if third control data are not to be put into the second subset of data elements (block 130), and transmits the data frame to the receiving node 250 (block 140).

Figure 8:
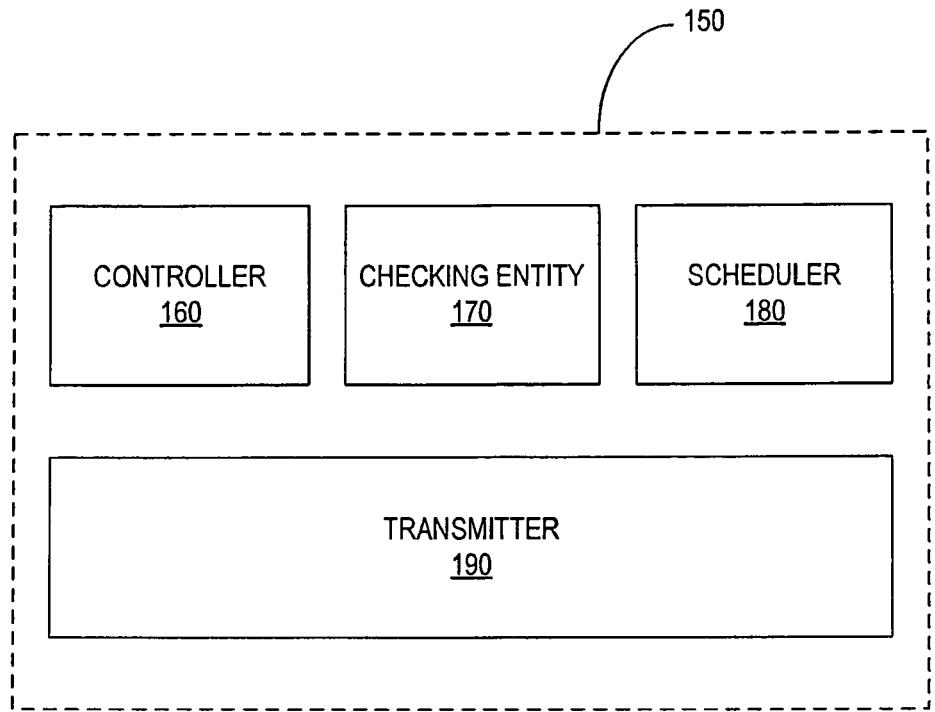
FIG. 8 illustrates an exemplary control node.

FIG. 8 illustrates the main functional components of an exemplary control node 150, which may comprise a base station (eNodeB), relay node, or terminal. As seen in FIG. 8, the control node 150 comprises a controller 160 for creating a data frame including a plurality of data elements for transmission to the receiving node 250. The controller 160 divides the data elements within a resource block of the data frame into a first subset and a second subset. The first subset comprises control data for controlling the receiving node 250. The second subset comprises data elements not used for sending control data to the receiving node 250. The control node 150 further comprises a checking entity 170 for checking whether third control data for another receiving node 250 are to be put into the second subset, a scheduler 180 for scheduling payload data for the receiving node 250 into the second subset if third control data are not to be put into the second subset of data, and a transmitter 190 for transmitting the data frame to the receiving node 250.

Figure 9:
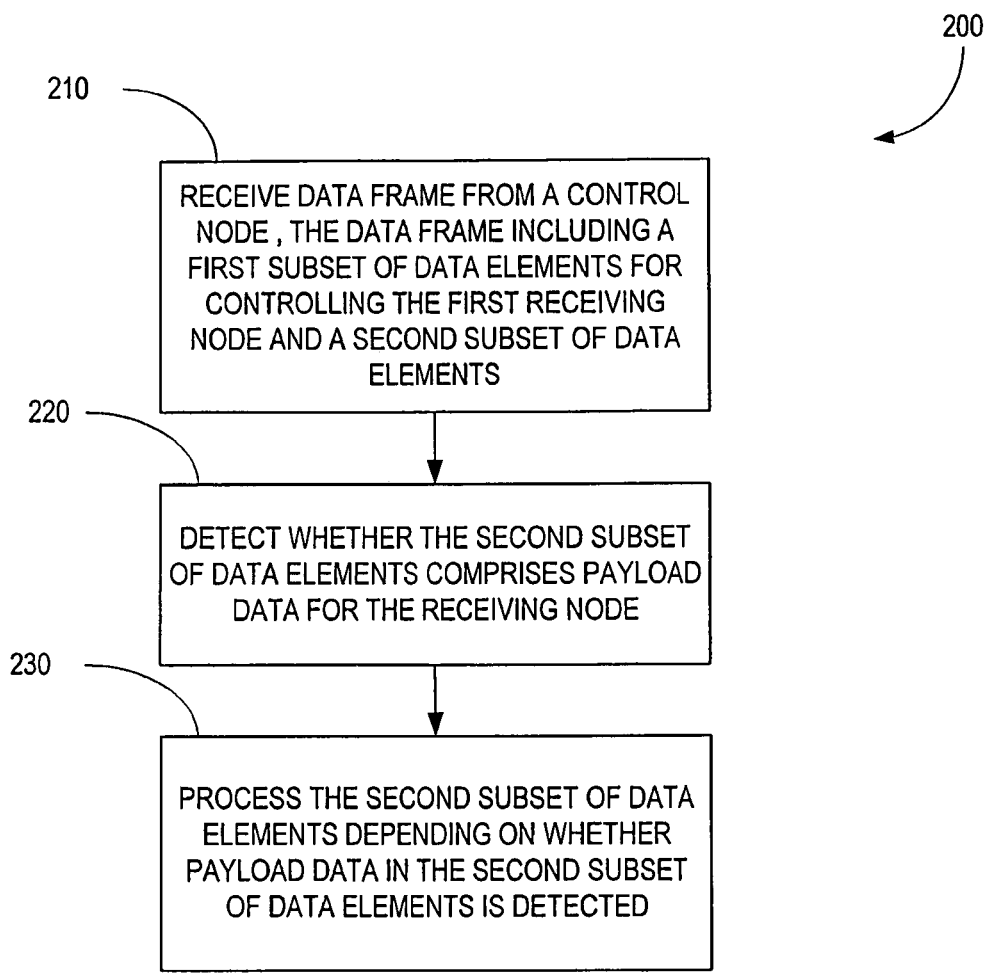
FIG. 9 illustrates a method implemented by a receiving node.

FIG. 9 illustrates an exemplary method 200 implemented by a receiving node 250, which may comprise a relay node or terminal. The method 200 comprises receiving a data frame containing a plurality of data elements from a control node (block 210). The data elements within a resource block of the data frame are divided into a first subset and a second subset. The first subset comprises control data for controlling the receiving node 250. The second subset comprises data elements not used for sending control data to the receiving node 250. The receiving node 250 detects whether the second subset contains payload data (block 220), and processes the second subset of data elements in dependence on the detection (block 230).

Figure 10:
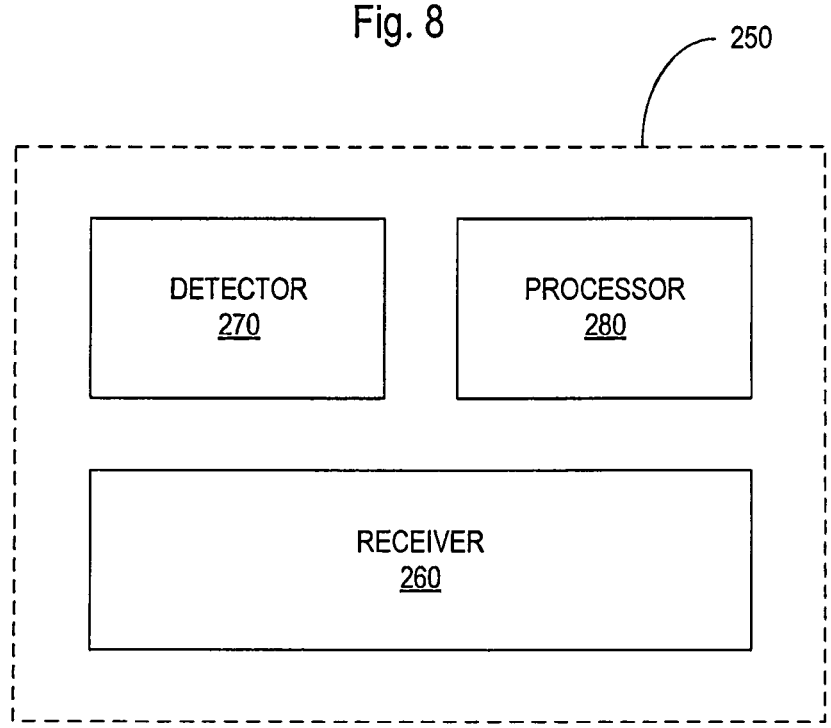
FIG. 10 illustrates an exemplary receiving node.

FIG. 10 illustrates the main functional components of an exemplary receiving node 250. As seen in FIG. 10, the receiving node 250 comprises a receiver 260, a detector 270, and a processor 290. The receiver 260 is configured to receive a data frame including a plurality of data elements from a control node 150. The data elements within a resource block of the data frame are divided into a first subset and a second subset. The first subset comprises control data for controlling the receiving node 250. The second subset comprises data elements not used for sending control data to the receiving node 250. The receiving node 250 further comprises a detector 270 for detecting whether the second subset contains payload data, and a processor 290 for processing the second subset of data elements in dependence of the detection. The detector 270 may comprise a checking entity 275 for checking whether a resource block on which the first control data are received is indicated by the first control data, and a decision entity 280 for deciding whether the second subset of data elements contains payload data based on the check.

ABBREVIATIONS

ARQ Automatic Repeat Request
CP Cyclic Prefix
DCI Downlink Control Information
DL Downlink
eNB eNodeB
eNodeB LTE base station
E-UTRAN evolved UMTS Terrestrial Radio Access Network
FDM Frequency Division Multiplexing
3GPP Third Generation Partnership Project
L1 Layer 1
L2 Layer 2
LTE Long Term Evolution
MBSFN Multicast Broadcast Single Frequency Network
OFDM Orthogonal Frequency Division Multiplexing
PDCCH Physical Downlink Control Channel
PDSCH Physical Downlink Shared Channel
RB Resource Block
RE Resource Element
Rel Release
R-PDCCH Relay-Physical Downlink Control Channel
R-PDSCH Relay-Physical Downlink Shared Channel
TDM Time Division Multiplexing
UE User Equipment
UL Uplink
UMTS Universal Mobile Telecommunication System

The invention claimed is:

1. A method for operating a control node in a wireless communication system, said method comprising:
creating a data frame defined by a frequency band and a time frame, said data frame comprising a plurality of data elements,
wherein each data element is defined by one of a plurality of subcarrier frequencies within said frequency band and one of a plurality of time intervals within said time frame,
wherein a resource block comprises a number of data elements adjacent in time and frequency,
wherein the data elements of a resource block are subdivided into at least a first subset and a second subset;
wherein the first subset comprises first control data for controlling a first receiving node, and
wherein the second subset comprises data elements of said resource block not used for control data for controlling said first receiving node;
checking whether second control data for a second receiving node are to be put into the second subset;
scheduling payload data for the first receiving node into the second subset if second control data for the second receiving node are not to be put into the second subset of data elements;
transmitting the data frame to the receiving node.

2. The method according to claim 1, wherein the first subset further comprises second control data.

3. The method according to claim 1, wherein the first control data comprises a downlink assignment and the second control data comprises an uplink grant or a second downlink assignment.

4. The method according to claim 3, wherein the second downlink assignment and/or uplink grant is for a data frame of another frequency band.

5. The method according to claim 1, wherein the receiving node is a relay node or a terminal.

6. The method according to claim 1, wherein the first control data indicates a resource block on which the first control data are transmitted if payload data are to be transmitted in the second subset of the data elements.

7. The method according to claim 1, wherein the first control data comprises an indication on resource blocks on which payload data are transmitted.

8. The method according to claim 1, wherein the first subset of data elements and the second subset of data elements are arranged in a mixed frequency and/or timely order in the data frame.

9. A control node for a wireless communication system, comprising:
a controller for creating a data frame defined by a frequency band and a time frame, comprising a plurality of data elements,
wherein each data element is defined by one of a plurality of subcarrier frequencies within said frequency band and one of a plurality of time intervals within said time frame,
wherein a resource block comprises a number of data elements adjacent in time and frequency,
wherein the data elements of a resource block are subdivided into at least a first subset and a second subset, and
wherein the first subset comprises first control data for controlling a first receiving node;
wherein the second subset comprises data elements of said resource block not used for control data for controlling said first receiving node;
a checking entity for checking whether second control data for a second receiving node are to be put into the second subset;
a scheduler for scheduling payload data for the first receiving node into the second subset if second control data for the second receiving node are not to be put into the second subset of data;
a transmitter for transmitting the data frame to the receiving node.

10. The control node according to claim 9, wherein the receiving node is a relay node or a terminal.

11. The control node according to claim 9, wherein the control node is an eNodeB, a relay node or a terminal.

12. The control node according to claim 9 wherein the first subset further comprises second control data.

13. The control node according to claim 9 wherein the first control data comprises a downlink assignment and the second control data comprises an uplink grant or a second downlink assignment.

14. The control node according to claim 13, wherein the second downlink assignment and/or uplink grant is for a data frame of another frequency band.

15. The control node according to claim 9, wherein the receiving node is a relay node or a terminal.

16. The control node according to claim 9, wherein the first control data indicates a resource block on which the first control data are transmitted if payload data are to be transmitted in the second subset of the data elements.

17. The control node according to claim 9, wherein the first control data comprises an indication on resource blocks on which payload data are transmitted.

18. The control node according to claim 9, wherein the first subset of data elements and the second subset of data elements are arranged in a mixed frequency and/or timely order in the data frame.

19. A method for operating a receiving node in a wireless communication system, said method comprising:
  receiving, from a control node, a data frame defined by a frequency band and a time frame, comprising a plurality of data elements,
  wherein each data element is define by one of a plurality of subcarrier frequencies within said frequency band and one of a plurality of time intervals within said time frame,
  wherein a resource block comprises a number of data elements adjacent in time and frequency,
  wherein the data elements of a resource block are subdivided into at least a first subset and a second subset, and
  wherein the first subset comprises first control data for controlling a first receiving node, and
  wherein the second subset comprises data elements of said resource block not used for control data for controlling said first receiving node;
  detecting whether the second subset contains payload data; and-processing the second subset of data elements in dependence of the detection.

20. The method according to claim 19, wherein the first receiving node is a relay node or a terminal.

21. The method according to claim 19, wherein the first control data indicates at least one resource block on which payload data are received.

22. The method according to claim 19, wherein the first control data indicates the resource block on which the first control data are transmitted if payload data are to be transmitted in the second subset of data elements.

23. The method according to claim 19, further comprising:
  checking whether a resource block on which the first control data are received is indicated by the first control data,
  checking whether a second control data are received in said resource block,
  deciding whether the second subset of data elements contains payload data based on the check.

24. A receiving node in a wireless communication system, comprising:
  a receiver for receiving a data frame defined by a frequency band and a time frame, comprising a plurality of data elements,
  wherein each data element is define by one of a plurality of subcarrier frequencies within said frequency band and one of a plurality of time intervals within said time frame,
  wherein a resource block comprises a number of data elements adjacent in time and frequency,
  wherein the data elements of a resource block are subdivided into at least a first subset and a second subset,
  wherein the first subset comprises first control data for controlling a first receiving node,
  wherein the second subset comprises data elements of said resource block not used for control data for controlling said first receiving node;
  a detector for detecting whether the second subset contains payload data; and
  a processor for processing the second subset of data elements in dependence of the detection.

25. The receiving node according to claim 24, further comprising:
  a checking entity for checking whether a resource block on which the first control data are received is indicated by the first control data,
  a decision entity for deciding whether the second subset of data elements contains payload data based on the check.

26. The receiving node according to claim 24, wherein the first receiving node is a relay node or a terminal.

27. The receiving node according to claim 24, wherein the first control data indicates at least one resource block on which payload data are received.

28. The receiving node according to claim 24, wherein the first control data indicates the resource block on which the first control data are transmitted if payload data are to be transmitted in the second subset of data elements.

29. The receiving node according to claim 24, wherein the detector is configured to:
  check whether a resource block on which the first control data are received is indicated by the first control data,
  check whether a second control data are received in said resource block,
  decide whether the second subset of data elements contains payload data based on the check.

* * * * *

UNITED STATES PATENT AND TRADEMARK OFFICE
CERTIFICATE OF CORRECTION

PATENT NO. : 8,855,074 B2  
APPLICATION NO. : 13/573793  
DATED : October 7, 2014  
INVENTOR(S) : Hoymann Page 1 of 1

It is certified that error appears in the above-identified patent and that said Letters Patent is hereby corrected as shown below:

On the Title Page, in Item (56), under "OTHER PUBLICATIONS", in Column 2, Line 4, delete "20112," and insert -- 2011, --, therefor.

On the Title Page, in Item (57), under "ABSTRACT", in Column 2, Line 5, delete "subset The" and insert -- subset. The --, therefor.

On the Title Page, in Item (57), under "ABSTRACT", in Column 2, Line 6, delete "node The" and insert -- node. The --, therefor.

Signed and Sealed this  
Fifth Day of May, 2015

Michelle K. Lee  
*Director of the United States Patent and Trademark Office*